(12) United States Patent
Franken et al.

(10) Patent No.: US 6,785,904 B1
(45) Date of Patent: Aug. 31, 2004

(54) METHOD AND SYSTEM FOR PROVIDING HOUSEHOLD LEVEL TELEVISION PROGRAMMING INFORMATION

(75) Inventors: Kenneth A. Franken, Iowa City, IA (US); Toufic Moubarak, Iowa City, IA (US); Jack Perry, Cedar Rapids, IA (US)

(73) Assignee: Decisionmark Corp., Cedar Rapids, IA (US)

(*) Notice: Subject to any disclaimer, the term of this patent is extended or adjusted under 35 U.S.C. 154(b) by 0 days.

(21) Appl. No.: 09/681,171

(22) Filed: Feb. 8, 2001

Related U.S. Application Data

(63) Continuation-in-part of application No. 09/538,215, filed on Mar. 30, 2000, which is a continuation-in-part of application No. 09/092,128, filed on Jun. 5, 1998, now Pat. No. 6,147,642.

(51) Int. Cl.[7] .............................................. H04N 5/445
(52) U.S. Cl. ........................................ 725/54; 725/46
(58) Field of Search ............................. 725/39, 49, 48, 725/35, 46, 54

(56) References Cited

U.S. PATENT DOCUMENTS

| | | | |
|---|---|---|---|
| 4,701,934 A | 10/1987 | Jasper | |
| 5,535,430 A | 7/1996 | Aoki et al. | |
| 5,587,715 A | 12/1996 | Lewis | |
| 5,778,317 A | * 7/1998 | Kaminsky | ................... 455/447 |
| 5,797,082 A | 8/1998 | Lusignan | |
| 5,950,127 A | 9/1999 | Nitta et al. | |
| 5,955,988 A | * 9/1999 | Blonstein et al. | ....... 342/357.13 |
| 6,002,394 A | * 12/1999 | Schein et al. | ............... 345/719 |
| 6,147,642 A | * 11/2000 | Perry et al. | ............ 342/357.06 |
| 6,160,545 A | * 12/2000 | Eyer et al. | ................... 345/721 |
| 6,252,547 B1 | * 6/2001 | Perry et al. | ............ 342/357.06 |

FOREIGN PATENT DOCUMENTS

| | | |
|---|---|---|
| DE | 200 17 785 U | 12/2000 |
| EP | 183 392 A | 6/1986 |
| JP | 06-268934 | 9/1994 |
| WO | WO 98 03012 A | 1/1998 |
| WO | WO 99 14947 A | 3/1999 |
| WO | WO 99 23813 A | 5/1999 |

OTHER PUBLICATIONS

Printed three pages of a website on Apr. 13, 2000. The Web address was www.antennaweb.org.
European Standard Search Report dated Aug. 2, 2001.

* cited by examiner

*Primary Examiner*—Andrew Faile
*Assistant Examiner*—Hunter Lonsberry
(74) *Attorney, Agent, or Firm*—Simmons, Perrine, Albright & Ellwood, P.L.C.

(57) ABSTRACT

A computer and internet-based system and method for providing television and radio programming information and channel assignments to users, which is based upon a household level determination of a location of the user.

10 Claims, 1 Drawing Sheet

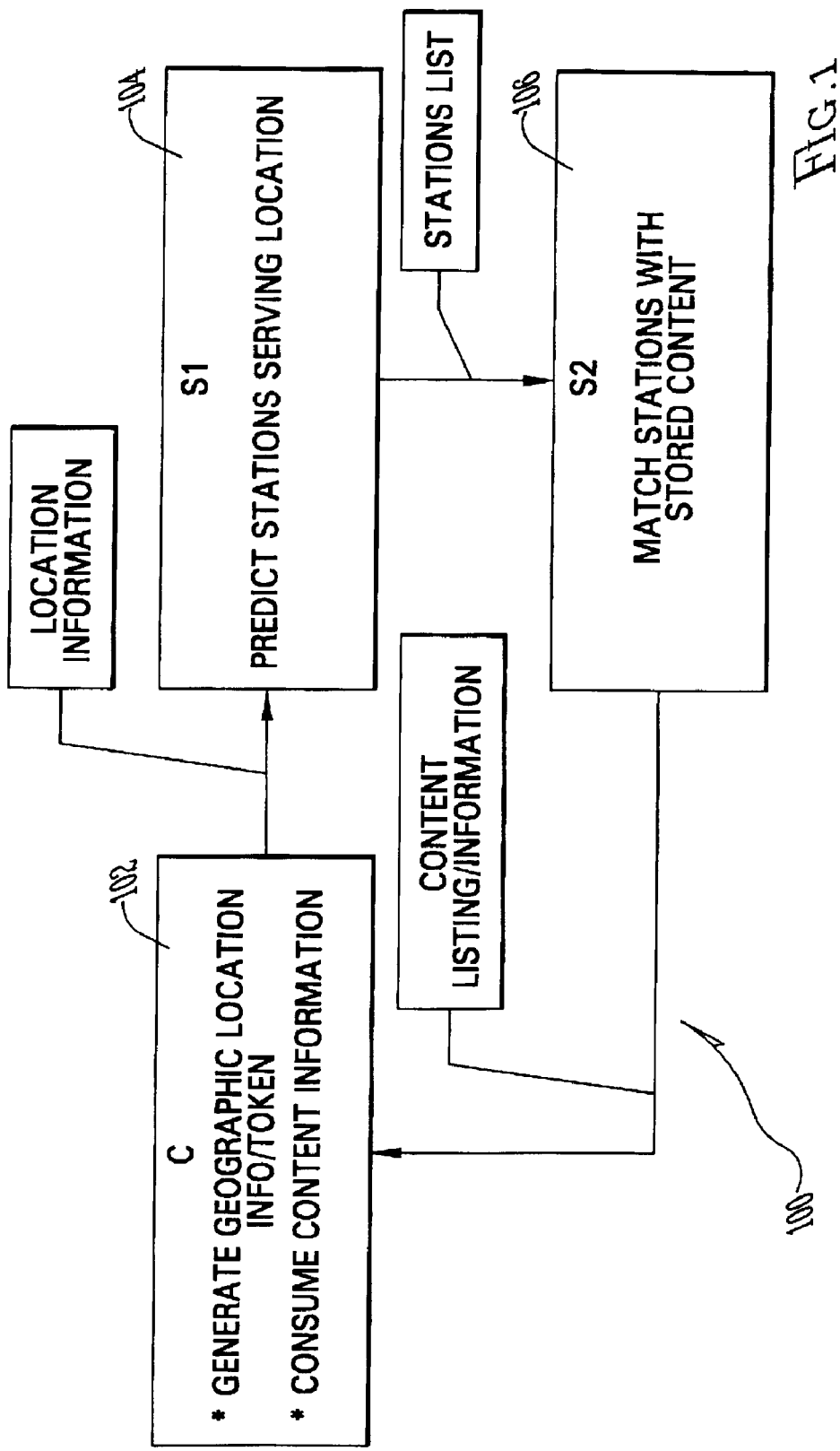

METHOD AND SYSTEM FOR PROVIDING HOUSEHOLD LEVEL TELEVISION PROGRAMMING INFORMATION

CROSS REFERENCE TO RELATED APPLICATIONS

This application is a continuation-in-part (CIP) of and relates to co-pending application entitled "METHOD AND APPARATUS FOR LIMITING ACCESS TO SIGNALS DELIVERED VIA THE INTERNET", having Ser. No. 09/538,215 and filed on Mar. 30, 2000, which is a CIP of Ser. No. 09/092,128 for "METHOD AND APPARATUS FOR LIMITING ACCESS TO SATELLITE COMMUNICATION SIGNALS", filed on Jun. 5, 1998, now issued as U.S. Pat. No. 6,147,642. This application also is related to co-pending application entitled "INDIVIDUALIZED CONTENT GUIDE", Ser. No. 09/681,172 which is filed on even date herewith and assigned to the same assignee. The above-referenced applications are incorporated herein in their entirety by this reference.

BACKGROUND OF INVENTION

In recent years, with the proliferation of sources of television programming including conventional terrestrially broadcast TV, cable TV, and satellite-delivered TV, numerous programming choices exist for a consumer. Consumers often desire to have a guide which shows the programming choices available at various times. The magazine, TV Guide, is one well-known example of a printed programming guide.

While TV Guide has enjoyed much success over the years, it has some drawbacks. First of all, with the large number of programming choices at any given time, it becomes increasingly difficult for a consumer to make a selection. This difficulty is compounded by the fact that a typical TV Guide is usually printed for a designated marketing area (DMA), which, in a very crude approximation, is generally an area of about a 100-mile radius from the location of the broadcast towers. Numerous independent municipalities are located within every DMA. This can result in a programming guide which contains programs which are not available to a particular customer. For example, since there are often several independent cable TV providers servicing the various communities in a DMA, with each cable TV company providing different services, any one viewer may need to sift through programming which is not accessible to them.

TV Guide Online is an example of a web-based programming guide which provides a user with a programming list which is individualized to the viewer based upon the viewer's zip code. This type of system works best when one and only one cable operator provides service to the entire zip code. Furthermore, TV Guide Online assumes that the signal strength of terrestrially broadcast stations is the same throughout the zip code. This is not correct.

Consequently, there exists a need for improved methods and systems for providing TV programming information to viewers in an efficient manner.

SUMMARY OF INVENTION

It is an object of the present invention to provide a system and method for providing TV programming in an efficient manner.

It is a feature of the present invention to utilize a household level programming guide.

It is another feature of the present invention to include a geocoding program which accepts street addresses, latitude/longitude (lat/lon) coordinates, or other household level location identifiers.

It is another feature of the present invention to precisely match available programming to a particular household or business location.

It is another feature of the present invention to provide cable channel assignment numbers along with the cable network designations when programming information is provided to a particular home.

It is an advantage of the present invention to achieve improved efficiency in delivery of programming information to viewers.

It is another advantage of the present invention to facilitate parental blocking of unwanted channels.

The present invention is an apparatus and method for providing household level TV programming information, which is designed to satisfy the aforementioned needs, provide the previously stated objects, include the above-listed features, and achieve the already articulated advantages. The present invention is carried out in a "wasted time-less" manner in a sense that the time consumed by a viewer in sifting through programming information which is not available at a particular location, and the time taken by a consumer after a programming selection has been made, to find the proper local channel assignment, has been greatly reduced.

Accordingly, the present invention is a system and method for delivery of TV programming information, including a geocoding program for accepting street addresses, latitude/longitude coordinates, or other unique identifiers of a location, and limiting the amount of information provided based upon unique identifiers of location.

BRIEF DESCRIPTION OF DRAWINGS

The invention may be more fully understood by reading the following description of the preferred embodiments of the invention, in conjunction with the appended drawings wherein:

FIG. 1 is a simplified block diagram view of a system of the present invention.

DETAILED DESCRIPTION

Now referring to the drawings wherein like numerals refer to like matter throughout, and more specifically referring to FIG. 1, there is shown a system of the present invention generally designated 100, including a consumer PC 102. Consumer PC 102 can be a general-purpose computer or any type of information appliance capable of receiving and displaying information from/to an operator. At least some of the information exiting the consumer PC 102 is representative of a unique location of the consumer PC 102. For example, street address, lat/lon coordinates, or some other unique location identifier (such as a 9-digit zip code or a token that identifies location information stored on another computer) is output by consumer PC 102. This can be as a result of user input, such as a keyboard and data entry screen, or it may be a computer-provided token. Street address is used herein to refer to a typical household address with a house number and a street name. This unique location information is provided, via a network, the Internet, or other digital data communication system, to a station prediction server 104. In a preferred embodiment, consumer PC 102 is coupled to station prediction server 104 via a broadband internet connection which is a coaxial cable TV cable which provides internet access to said consumer PC 102. It should be understood that other means of information transmission could be used as well, such as telephone, DSL, wireless, etc. Consumer PC 102 may be a simple stand-alone PC or in a preferred embodiment, it is coupled to a television set or has a PCDTV board therein for receiving broadcast, cable, or satellite television signals. The term "PCDTV board" is used to describe any type of apparatus used in conjunction with a microprocessor in a PC which is capable of receiving and demodulating an incoming television signal irrespective if it is terrestrially broadcast or provided over a cable TV network. It is also believed that television programming will become available over the Internet so the consumer PC 102 would be preferably capable of receiving programming (which is also broadcast on terrestrial television station broadcasts), along with other web-based content.

Generally, station prediction server 104 will perform computations to generate a list of electronically transmitted programming options which are available to the viewer. This could be, but need not be, limited to a list of broadcast television or radio stations which will be available for use by the viewer. The list could also include television stations which are available over the Internet. These computations can include signal strength computations for the terrestrial broadcast signals in the vicinity of the user's location. Various methods of signal strength calculations are possible. Depending upon tradeoffs made regarding the speed and the accuracy of the station prediction server, the software to perform these tasks can range from simple theoretical or empirical propagation curves to the more elaborate Longley-Rice computations, with adjustments for the type of antenna and antenna-mounting environment, as well as terrain or obstructions between the transmitter and the receiver at the user's location. Details of performing the signal strength calculations and station determination are provided in the above-referenced co-pending applications.

Station prediction server 104 could also use the location information to determine which cable providers serve the viewer's location.

Consumer PC 102 can also be used by the consumer or viewer to provide useful information, such as the level of cable TV or satellite TV service, if any, actually subscribed to by the consumer. Consumer PC 102 can also be used to convey information relating to other preferences (other than mere ability to receive the signal) with which the consumer might like to have programming information pre-processed before being used by the consumer; e.g., the program listings can be sorted by type or category of programming desired by the consumer, such as sports, full-length movies, etc. More detail on such individualized programming guides is included in the above-referenced patent application entitled "Individualized Content Guide."

Station prediction server 104 further has information therein, or accessible therefrom, relating to stations and channels and other programming available via cable (CATV or cable radio) and satellite delivery to various locations. This information is available for purchase from sources such as Tribune Media Services of 435 N. Michigan Ave., Suite 1500, Chicago, Ill. USA or TV Data Technologies, LLP of 333 Glen St., Glens Falls, N.Y. 12801, USA.

Programming content matching server 106 takes a station list from station prediction server 104 and matches these stations with well-known programming content for such stations, and provides household level customized content listing back to the consumer PC 102. The information to perform this step is also available from sources listed in the preceding paragraph.

The programming content matching server 106 can now assign a particular channel number to the programming available at the household level. This relieves the viewer from the task of associating station call letters or network affiliations to channel numbers. For example, a local FOX television affiliate may broadcast to two nearby viewers— one at a first location and another at a second location on a single UHF channel. The same channel might be provided to each of these viewers via their local cable providers (assuming the two locations are in nearby towns, each with independent cable TV operators). One cable TV provider might provide it on cable channel 8, and the other on cable channel 2. The present invention, via server 106, has a database of information available which can be used to provide each of these two viewers with the content of programming information available, as well as the proper cable channel assignments for their own cable operator.

Server 104 and server 106 are described herein as being distinct servers. It should be understood that this is merely one possible design. A single server could be used to perform the tasks of servers 104 and 106. Multiple servers could also be used as well.

In operation, the apparatus and method of the present invention as shown and described in FIG. 1, could function as follows:

1. A viewer, through an HTML data entry form, inputs a local address (street address or lat/lon, etc.) of a household or business location.

Alternatively, the viewer's computer will automatically provide such information through a token or otherwise.

2. The local address, if it is a street address, is geo-coded to determine lat/lon.

3. A signal strength prediction is made for the lat/lon for various terrestrially broadcast TV stations in the vicinity of the lat/lon.

4. A list of stations otherwise available to that lat/lon via cable or satellite is also generated, using a point in polygon method or another method, from a database providing detailed programming information for a variety of locations.

4(a)The list of stations may be either expanded or restricted based upon business rules governing delivery of programming, such as sports blackouts, syndicated exclusivity, satellite delivered distant network service, etc.

5. A complete list of stations available to the viewer is then generated.

6. The complete list of stations is matched with stored programming content and with cable channel assignments, where appropriate.

7. The information is then preferably displayed to the viewer on consumer PC 102 in a format as described in the above-mentioned co-pending application entitled "Individualized Content Guide."

8. The viewer then can efficiently determine what programming is available on which channel. The viewer may elect to block a channel based upon this information. The viewer may elect to watch a particular channel, or the viewer may opt to avoid watching based upon this information. Numerous other uses of the information are possible.

It should be understood that the information generated by the present invention need not be used solely for displaying the same to customers. The information may be provided to other persons, entities or equipment where it could be stored, manipulated or otherwise used for another purpose.

Throughout this description, reference is made to a location of a viewer with respect to terrestrially broadcast signals, because it is believed that the beneficial aspects of the present invention would be most readily apparent when used in connection with such signal strength limitations; however, it should be understood that the present invention is not intended to be so limited and should be hereby construed to include other content generating criteria, such as whether the viewer is in an area serviced by cable TV and whether the viewer is a subscriber to cable TV, etc.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An electronic programming guide apparatus comprising:
    a PC at a first household location;
    a computer system at a second location, coupled to said PC via a computer network;
    said PC providing information regarding a local address of said first location to said computer system;
    wherein said information regarding a local address includes information about the first household location which is not a zip code;
    said computer system adapted and configured to generate a record of electronically transmitted programming which is available to be received at said first household location, and for generating an electronic programming guide based upon said record;
    wherein said information regarding a local address is a street address;
    wherein said record of electronically transmitted programming which is available to be received at said first household location includes a list of terrestrially broadcast television stations which are determined, via calculations, to exceed a predetermined level of signal strength at said first household location;
    wherein said calculations involve a Longley-Rice signal strength calculation;
    wherein said record of electronically transmitted programming which is available to be received at said first household location includes a list of cable program channels which are available to a cable subscriber at said first household location; and
    wherein said electronic programming guide includes a representation of a first cable channel assignment for a first terrestrially broadcast station, which has a broadcast coverage area including said first household location and a second household location, said first cable channel assignment is different from a second cable channel assignment which is also provided by said computer system, to a viewer at said second household location for said first terrestrially broadcast station.

2. An apparatus of claim 1 wherein said electronic programming guide includes a representation of a first channel assignment for a first satellite delivered network, which has a marketing area including said first household location and a second household location, said first channel assignment is different from a second channel assignment which is also provided by said computer system, to a viewer at said second household location for said satellite delivered broadcast network.

3. A method of providing information relating to electronically transmitted programming comprising the steps of:
    providing digital information representative of a local address of a first location wherein said local address is not a zip code;
    generating a list of stations available at said first location;
    matching said list of stations to predetermined programming content associated with stations on said list of stations;
    providing to said first location a signal representative of a programming guide which has been tailored to exclude programming content which is not available at said first location;
    wherein said local address is a street address;
    wherein said step of generating a list of stations at said first location includes a step of determining a signal strength at said first location of terrestrially broadcast signals which exceed a predetermined threshold;
    wherein said step of generating a list of stations comprises making a determination of a characteristic of cable television programing which is provided to said first location;
    wherein said step of matching said stations comprises making a local cable channel assignment determination for said first location;
    wherein said programming guide has included therein only programming which is available at said first location;.
    wherein said programming guide includes information relating to programing available from at least the following sources: terrestrially broadcast television, cable television, satellite television, and internet-delivered television programming; and
    wherein said step of making a local cable channel assignment determination for said first location comprises assigning a cable channel number for a first terrestrially broadcast station, which has a broadcast coverage area including said first location and a second location, said first cable channel assignment is different from a second cable channel assignment which is also provided to a viewer at said second location for said first terrestrially broadcast station.

4. A system comprising:
    a first PC, disposed at a first viewer location, which is in a private single family dwelling, having a broadband internet connection via a coaxial cable TV cable which also carries cable TV signals to said first PC;
    said first PC adapted and configured to provide digital information regarding a street address of said first location without a requirement for repeated user input of such street address;
    said first PC firer including a PCDTV board therein which is coupled to and receives television programing signals on said coaxial cable TV cable;
    a computer system, disposed at a server location and coupled to said first PC via an internet connection, said computer system executing software which is adapted and configured to generate a list of television and radio programming options which are available to a viewer at said first viewer location, said list including only television and radio programming options which are available to a viewer at said fist viewer location;
    said computer system further executing software which is adapted and configured to generate a programming guide based upon said list of television and radio programming options;

wherein said list includes a list of terrestrially broadcast television stations which are determined, via Longley-Rice calculations, to exceed a predetermined threshold of signal strength at said first viewer location;

wherein said list further includes a list of cable programming channels which are available to a cable subscriber at said viewer location;

wherein said programming guide includes a representation of a first cable channel assignment for a first terrestrially broadcast station, which has a broadcast coverage area including said first viewer location and a second viewer location, said first cable channel assignment is different from a second cable channel assignment which is also provided by said computer system, to a viewer at said second viewer location for said first terrestrially broadcast station;

wherein said programming guide includes a representation of a first channel assignment for a first satellite delivered network, which has a marketing area including said first viewer location and a second viewer location, said first channel assignment is different from a second channel assignment which is also provided by said computer system, to a viewer at said second viewer location for said satellite delivered broadcast network; and, wherein said programming guide includes information relating to programming available from at least the following sources: terrestrially broadcast television, cable television, satellite television, and internet-delivered television programming.

5. A system comprising:

a first PC, disposed at a first viewer location, which is in a private single family dwelling, having a broadband internet connection via a DSL line;

said first PC adapted and configured to provide digital information regarding a street address of said first location without a requirement for repeated user input of such street address;

said first PC further including a PCDTV board therein which is coupled to and receives television programming signals on a signal cable;

a computer system, disposed at a server location and coupled to said fist PC via an internet connection, said computer system executing software which is adapted and configured to generate a list of television and FM radio programming options which are available to a viewer at said first viewer location, said list including only television and FM radio programming options which are available to a viewer at said first viewer location;

said computer system further executing software which is adapted and configured to generate a programming guide based upon said list of television and FM radio programing options;

wherein said list includes a list of terrestrially broadcast television and FM radio stations which are determined, via Longley-Rice calculations, to exceed a predetermined threshold of signal strength at said first viewer location;

wherein said list further includes a list of cable programming channels which are available to a cable subscriber at said viewer location;

wherein said programming guide includes a representation of a first cable channel assignment for a first terrestrially broadcast station, which has a broadcast coverage area including said first viewer location and a second viewer location, said first cable channel assignment is different from a second cable channel assignment which is also provided by said computer system, to a viewer at said second viewer location for said first terrestrially broadcast station;

wherein said programming guide includes a representation of a first channel assignment for a first satellite delivered network, which has a marketing area including said first viewer location and a second viewer location, said first channel assignment is different from a second channel assignment which is also provided by said computer system, to a viewer at said second viewer location for said satellite delivered broadcast network; and, wherein said programming guide includes information relating to programming available from at least the following sources: terrestrially broadcast television, cable television, satellite television, and internet-delivered television programming as well as FM radio.

6. A system of claim 5 wherein said signal cable and said DSL line are spatially coextensive.

7. A method of providing information relating to electronically transmitted programming comprising the steps of:

providing digital information representative of a local address of a first location wherein said local address is not a zip code;

generating, via a signal strength calculation, a list of stations available at said first location;

matching said list of stations to predetermined programming content associated with stations on said list of stations;

providing to said first location a signal representative of a programming guide which has been tailored to exclude programing content which is not available at said first location; and further including the step of restricting said predetermined program content based upon a sports blackout business rule.

8. A system of claim 5 wherein said list is restricted based upon a predetermined sports blackout business rule.

9. A system of claim 4 wherein said list is restricted based upon a predetermined business rule.

10. A system of claim 4 wherein said predetermined business rule includes a rule based upon syndicated exclusivity.

* * * * *

UNITED STATES PATENT AND TRADEMARK OFFICE
CERTIFICATE OF CORRECTION

PATENT NO. : 6,785,904 B1
DATED : August 31, 2004
INVENTOR(S) : Kenneth A. Franken, Toufic Moubarak and Jack Perry It is certified that error appears in the above-identified patent and that said Letters Patent is hereby corrected as shown below:

Column 5,
Line 45, please replace the word "program" with -- programming --.

Column 6,
Lines 21 and 53, please replace the word "programming" with -- programming --.
Line 52, please replace the word "firer" with -- further --.

Signed and Sealed this

Twenty-sixth Day of October, 2004

JON W. DUDAS
*Director of the United States Patent and Trademark Office*